US011016633B2

(12) United States Patent
Rapp et al.

(10) Patent No.: US 11,016,633 B2
(45) Date of Patent: May 25, 2021

(54) INTELLIGENT SUPPORT RECOMMENDATIONS FOR SNAP-INS

(71) Applicant: salesforce.com, inc., San Francisco, CA (US)

(72) Inventors: Adrian Dieter Rapp, Sausalito, CA (US); Xin Wang, Fremont, CA (US); Peter Francis White, San Francisco, CA (US); Sheila Bernadette Christian, Millbrae, CA (US)

(73) Assignee: salesforce.com, inc., San Francisco, CA (US)

( * ) Notice: Subject to any disclaimer, the term of this patent is extended or adjusted under 35 U.S.C. 154(b) by 208 days.

(21) Appl. No.: 15/480,474

(22) Filed: Apr. 6, 2017

(65) Prior Publication Data
US 2018/0095612 A1  Apr. 5, 2018

Related U.S. Application Data

(60) Provisional application No. 62/403,346, filed on Oct. 3, 2016.

(51) Int. Cl.
*G06F 3/0481* (2013.01)

(52) U.S. Cl.
CPC ................ *G06F 3/04817* (2013.01)

(58) Field of Classification Search
CPC .......... G06F 3/04817; G06F 3/04842; G06F 11/3438; G06F 11/3476; G06F 9/44
See application file for complete search history.

(56) References Cited

U.S. PATENT DOCUMENTS

| | | | |
|---|---|---|---|
| 9,294,719 B2 | 3/2016 | Uhma et al. | |
| 2003/0011629 A1* | 1/2003 | Rouse | G06F 17/30017 715/705 |
| 2008/0250323 A1* | 10/2008 | Huff | G06F 9/453 715/733 |
| 2014/0188956 A1* | 7/2014 | Subba | G06F 9/453 707/829 |

(Continued)

FOREIGN PATENT DOCUMENTS

WO   WO2007/134373   *  5/2007  .......... G06Q 50/00

OTHER PUBLICATIONS

YouTube, Clippy Microsoft Office Assistant, describing help system for the widely known program Microsoft Word 97, downloaded from https://www.youtube.com/watch?v=bJGSrjNoMWw (Year: 2007).*

*Primary Examiner* — Eric J Yoon
(74) *Attorney, Agent, or Firm* — Sterne, Kessler, Goldstein & Fox P.L.L.C.

(57) ABSTRACT

A non-transitory tangible computer readable medium containing instructions configured to cause one or more processors to execute a process. The process comprises monitoring user input, preferences, and navigation patterns of a website or computer application on a user computer device, such as a computer, phone, or tablet. Administrator-defined rules are applied to the user input, preferences, or navigation patterns to generate a suggestion for a customer service application, such as a self-service FAQ page, video chat assistance, live chat assistance, or a case ticket system. The customer service application suggestion is displayed on the user computer device and may be transferred to a different device.

20 Claims, 16 Drawing Sheets

(56) References Cited

U.S. PATENT DOCUMENTS

2014/0245141 A1\* 8/2014 Yeh .................. G06F 9/453
   715/708
2015/0121219 A1\* 4/2015 Baklanovs ............. G06F 16/22
   715/712

\* cited by examiner

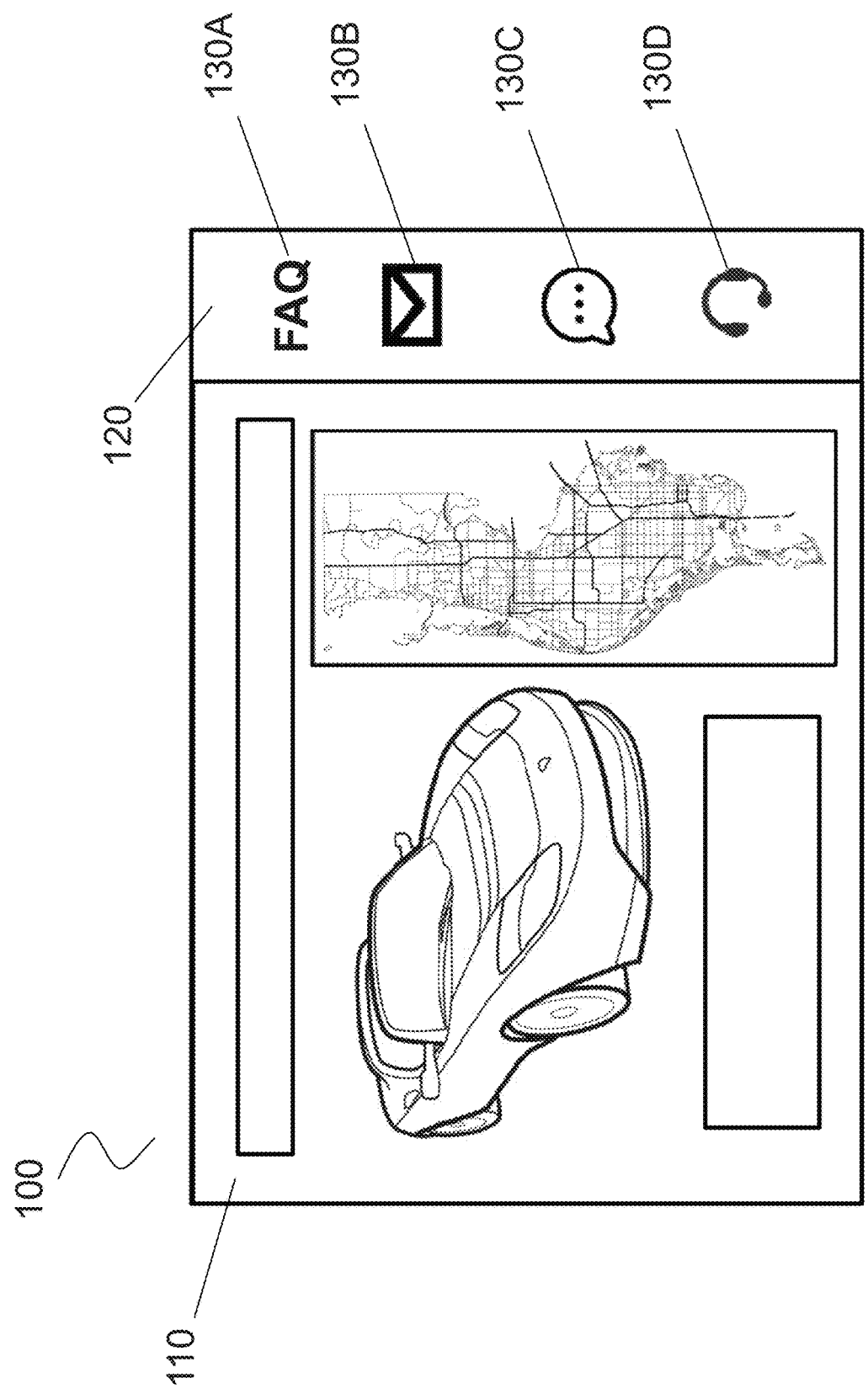

INTELLIGENT SUPPORT RECOMMENDATIONS FOR SNAP-INS

CROSS-REFERENCE TO RELATED APPLICATIONS

This application claims the benefit of U.S. Provisional Patent Application No. 62/403,346 filed Oct. 3, 2016, the entirety of which is incorporated herein by reference.

BACKGROUND

As technology continues to evolve, the demand for customer service to aid in the usage of technology also continues to evolve. Users of technology across many platforms seek customer service assistance to both enhance their user experience as well as to troubleshoot potential problems. Users may seek assistance by utilizing various devices, but may also seek assistance across different areas of content. Based on the plethora of customer service options, however, users may become overloaded, finding difficulty in locating the most helpful source of customer service.

BRIEF DESCRIPTION OF THE DRAWINGS

The accompanying figures are included to provide a further understanding, and are incorporated in and constitute a part of this specification. The drawings illustrate one or more embodiments. As such, the disclosure will become more fully understood from the following detailed description, taken in conjunction with the accompanying figures, in which:

FIG. 1A is a screen display of a graphical user interface comprising support channels as per an aspect of an embodiment of the present invention.

DETAILED DESCRIPTION

Figure 1B:
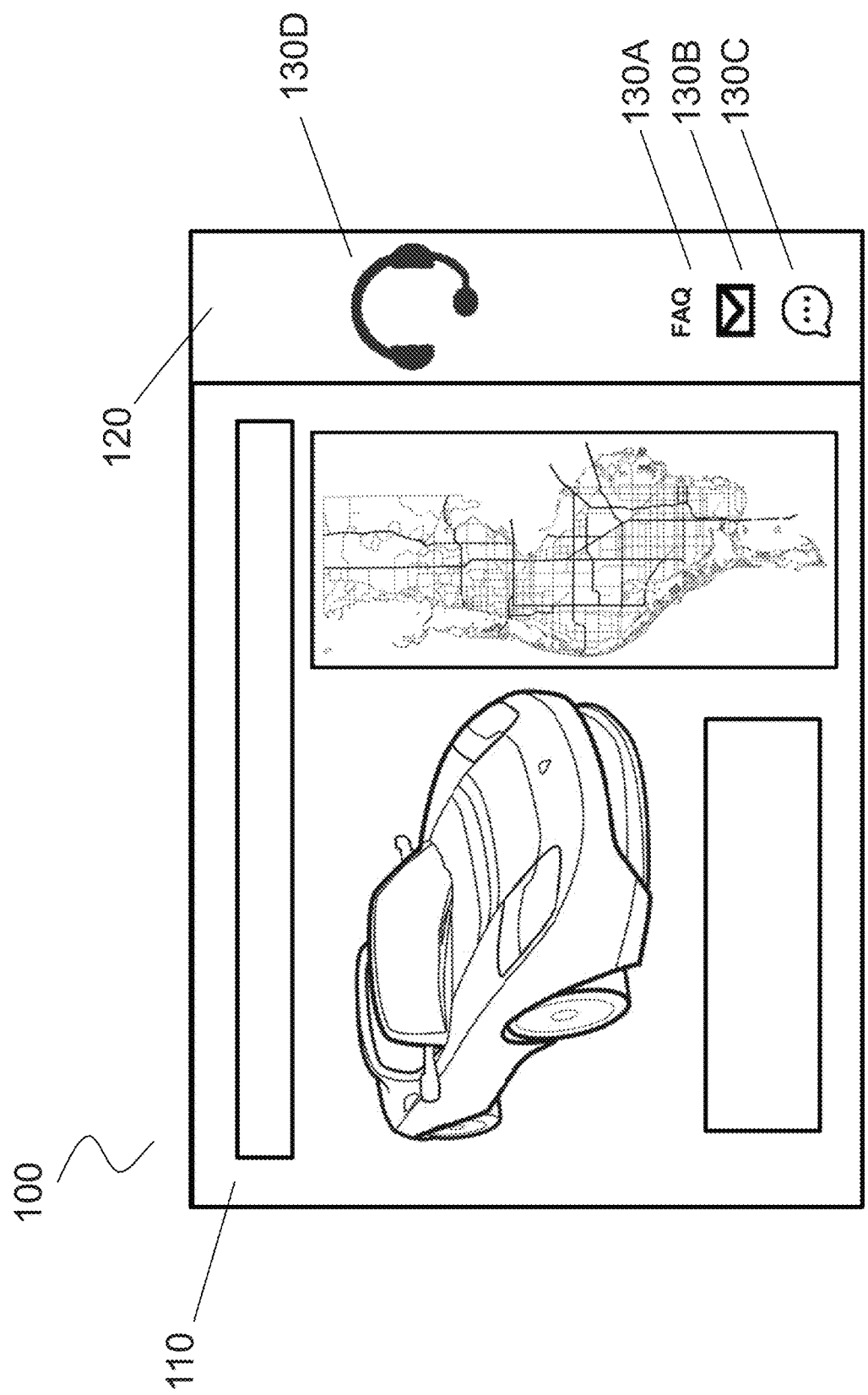
FIG. 1B is a screen display of a graphical user interface comprising a recommended support channel as per an aspect of an embodiment of the present invention.

Embodiments may be employed to recommend customer service content and live customer service assistance channels to users.

Embodiments may comprise a non-transitory tangible computer readable medium containing instructions configured to cause one or more processors to execute a process. The process may comprise: monitoring user input, preferences, or navigation patterns of a computer application on a user computer device; applying administrator-defined rules to user input, preferences, or navigation patterns; generating a customer service application suggestion; and displaying the customer service application suggestion on the user computer device. The customer service application suggestion may comprise live channel assistance, a self-service channel, a combination thereof, and/or the like.

This disclosure will now be described more fully with reference to the accompanying drawings, in which embodiments of this document are shown. This document should be read to include embodiments of many different forms and should not be construed as being limited to the embodiments set forth herein; rather, these embodiments are provided so that this disclosure will be thorough and complete, and will fully convey the concepts contained within this document to those skilled in the art.

Referring to FIG. 1A, a screen display 100 of a graphical user interface comprising support channels 130A-130D is shown. According to an embodiment, the screen display 100 may comprise an application screen 110, a help menu widget 120, and support channels 130A-130D.

Screen display 100 may be a graphical user interface as displayed on a desktop or laptop computer. Screen display 100 may be displayed on a device with a touch screen interface such as a mobile phone, a tablet, and/or the like. A user may interact with screen display 100 to view content on application screen 110. A user may interact with screen display 100 to utilize help menu widget 120. A user may interact with screen display 100 to utilize one or more support channels 130A-130D.

Screen display 100 may comprise application screen 110. Application screen 110 may display a website, software application, local client desktop interface, a combination thereof, and/or the like. Screen display 100 may comprise help menu widget 120. In an embodiment, help menu widget 120 may occupy a portion of screen display 100 separate from application screen 110. Help menu widget 120 may be outlined in various orientations such as vertical, horizontal, diagonal, a combination thereof, and/or the like. In an embodiment, help menu widget 120 may overlay on top of application screen 110. In an embodiment, help menu widget 120 may not be a specific portion of screen display 100 but may instead refer to collective support channels 130A-130D regardless of the position of support channels 130A-130D. In an embodiment, help menu widget 120 may be installed into the underlying website, software application, or local client desktop interface displayed on application screen 110. In this embodiment, developers of the underlying website, software application, or local client desktop interface may add the widget to existing website or software code. In an embodiment, help menu widget 120 may be installed on a user device displaying screen display 100 and overlay on top of application screen 110.

Help menu widget 120 may comprise several support channels 130A-130D. While FIG. 1A depicts four support channels, help menu widget 120 may comprise more or less than four support channels. Support channels 130 may be any application that provides customer support or customer assistance to an end user. In an embodiment, support channels may comprise a self-service channel 130A, a case ticket channel 130B, a live chat channel 130C, a video chat channel 130D, a combination thereof, and/or the like. In an embodiment, support channels 130A-130D may comprise icons, tiles, bars, a combination thereof, and/or the like displayed on screen display 100. In an embodiment, users may utilize and select a support channel to gain access to customer service interfaces. In an embodiment, support channels 130A-130D are grouped together on screen display 100. In an embodiment, support channels 130A-130D are dispersed throughout screen display 100.

Self-service channel 130A may comprise an article, webpage, guide, blog post, FAQ, video explanation, audio explanation, a combination thereof, and/or any other medium that aids a user in solving a problem. Case ticket channel 130B may comprise allowing a user to file a case ticket, wherein an agent or customer service representative may respond to the case ticket. Case ticket channel 130B may also provide an estimated response time to a submitted case ticket. Live chat channel 130C may comprise a text chat with a customer service representative. In an embodiment, the text chat may also allow the user and customer service representative to share photographs, videos, hyperlinks, documents, executable computer files, drivers, a combination thereof, and/or the like. In an embodiment, live chat channel 130C may allow a user to chat with an automated system or artificial intelligence, which provides answers to the user. Video chat channel 130D may comprise a live video stream of a customer service representative. In an embodiment, video chat channel 130D allows the user to view the customer service representative and relay information real-time to the customer service representative. Video chat channel 130D may also include audio transmission between the user and the customer service representative along with the interaction capabilities found in live chat channel 130C. In an embodiment, users may also stream video of themselves to the customer service representative.

Referring to FIG. 1B, a screen display 100 of a graphical user interface comprising support channels 130A-130D is shown. According to an embodiment, the screen display 100 may comprise an application screen 110, a help menu widget 120, and support channels 130A-130D. In an embodiment, help menu widget 120 monitors user input, preferences, navigation patterns, a combination thereof, and/or the like to promote or suggest a support channel that best suits the user's needs. For example, based on information, or tokens, such as page context, device context, user context, or customer preference and the process explained in FIG. 2A and FIG. 2B, help menu widget 120 may suggest that the user utilize video chat channel 130D. As a result, help widget 120 may promote video chat channel 130D. Promotion may occur by enlarging the icon associated with video chat channel 130D, shrinking the icons associated with support channels 130A-130C, using color, movement, or other visual clues to distinguish video chat channel 130D, a combination thereof, and/or the like. In an embodiment, a user may disregard the suggestion and select another available support channel 130.

Figure 2A:
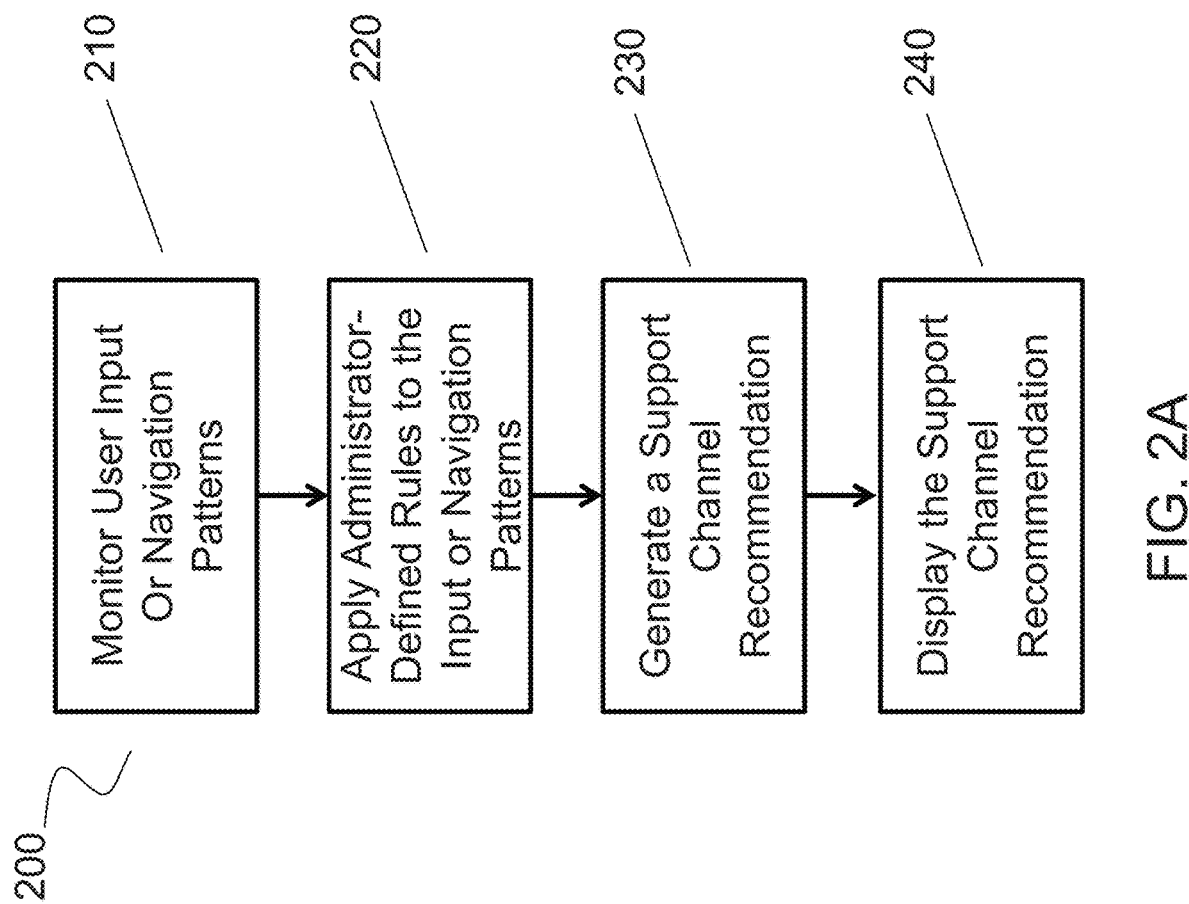
FIG. 2A is a flow diagram of a support channel recommendation process as per an aspect of an embodiment of the present invention.
Figure 2B:
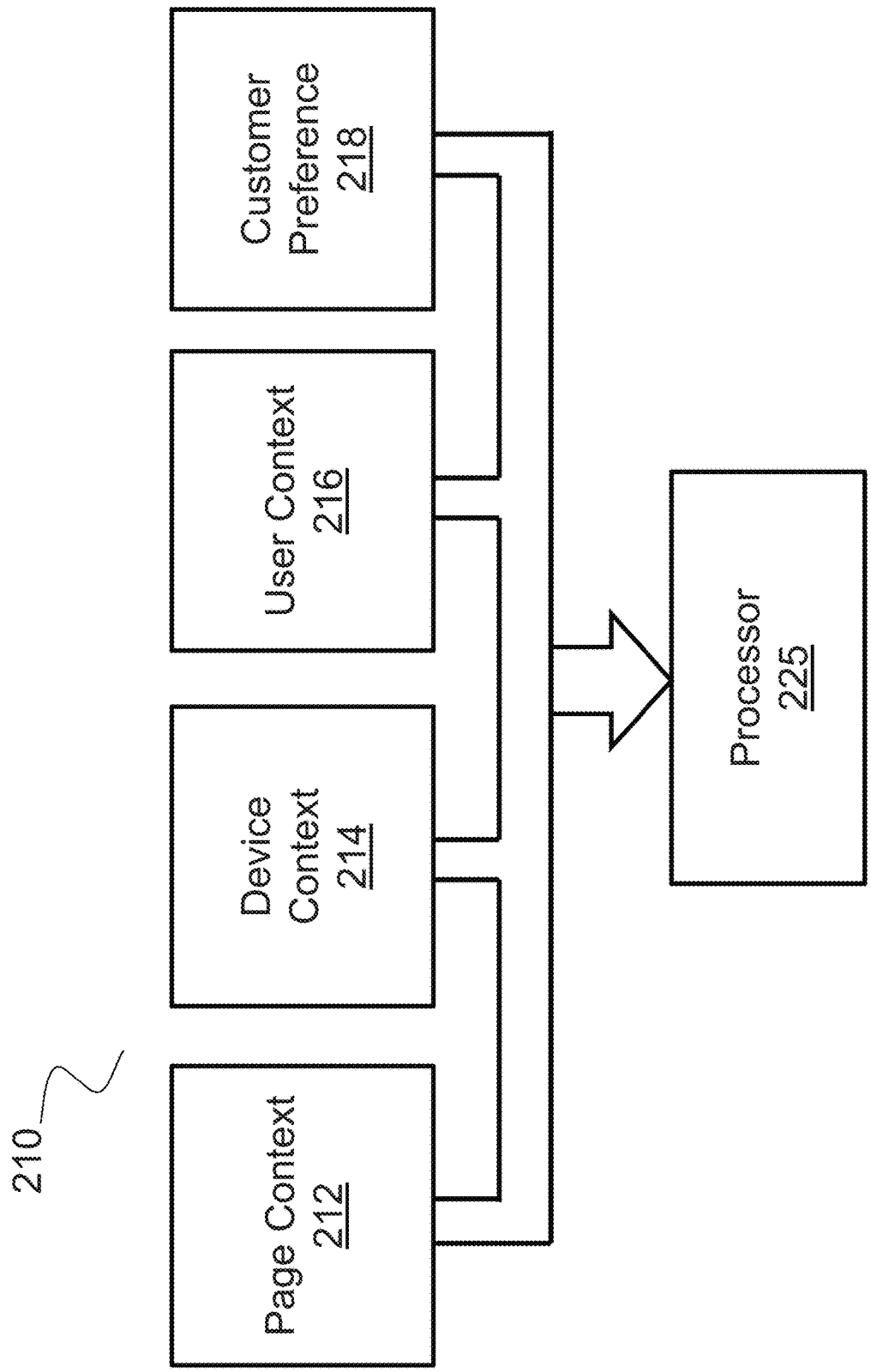
FIG. 2B is a block diagram of system interaction as per an aspect of an embodiment of the present invention.

Referring to FIG. 2A, a flow diagram of support channel recommendation process 200 is shown. In an embodiment, a website or software application may utilize process 200 to promote a support channel recommendation to a user. According to an embodiment, user inputs, preferences, navigation patterns, a combination thereof, and/or the like may be monitored at 210. FIG. 2B further details the monitoring at 210. At 220, administrator-defined rules may be applied to the input, preferences, or navigation patterns monitored at 210. In an embodiment, administrator-defined rules may be implemented in an existing software application external to support channel recommendation process 200. Applying administrator-defined rules at 220 may utilize rules defined by administrators or developers of websites or software applications. Administrators or developers may utilize support channel recommendation process 200 to recommend support channels to users of their websites or software applications.

In an embodiment, administrators or developers may set general channel preferences. For example, an administrator or developer may define a rule stating that the live chat channel is generally preferred over the video chat channel. An administrator or developer may define a rule stating that the video chat channel is generally preferred over the case ticket channel.

In an embodiment, an administrator or developer may specify a domain range to override other preferences to promote a channel. For example, 220 may always recommend a video chat channel if available when a user is browsing an online loan application or shopping cart webpage.

In an embodiment, administrators or developers may specify a default backup channel based on the time or location. For example, the case ticket channel may always be recommended outside of business hours from 10:00 pm to 8:00 am.

In an embodiment, rules may be tied to each support channel. Each support channel may comprise default rules or minimum requirements. For example, in order to recommend the video chat channel, a connection speed equal to or faster than 2 Mb/s and available agents or customer representatives may be required.

In an embodiment, a support channel may comprise a waiting queue with an upper limit. For example, up to twenty users may wait for the video chat channel or up to fifty users may wait in the live chat queue. In an embodiment, when a channel reaches the channel limit, the next available support channel may be recommended.

At 220, the administrator-defined rules may be adjustable. In an embodiment, an administrator or developer may alter specific segments of program instructions or code to adjust the administrator-defined rules. In an embodiment, an administrator or developer may utilize a separate graphical user interface to adjust the administrator-defined rules. These rules may or may not be available for a user to adjust. In an embodiment, a subset of the rules may be available to a user to adjust. In an embodiment, the administrator-defined rules may be adjustable remotely. For example, an administrator or developer may be able to adjust the rules without the need to physically connect to the user device. In an embodiment, updated administrator-defined rules may be downloaded by a user device.

At 230, a support channel recommendation may be generated. Based on the application of administrator-defined rules to the monitored user inputs, preferences, and navigation patterns at 220, a support channel ranking may be generated at 230. In an embodiment, the support channel recommendation may be generated by highlighting the single most relevant support channel based on the ranking of the support channels. In an embodiment, the support channel recommendation may comprise multiple support channels based on the ranking. For example, the support channel recommendation may comprise the two highest ranked support channels based on the application of the administrator-defined rules.

In an embodiment, 230 may also record information relevant to generating a support channel recommendation. This information may be utilized in future support channel recommendations with the same or with a different user. Information that may be recorded may comprise: the average total time needed to resolve a customer issue, the location where the case was initiated, customer satisfaction feedback for each channel, an administrator-defined cost for each channel per customer issue, the time spent in the self-service channel per visit, agent or customer service representative capacity, customer demand, a combination thereof, and/or the like. This information may be considered at 230 when determining which support channel to recommend. In an embodiment, each support channel may have an average set of values after information is gathered. For example, if a live chat channel is initiated at a certain location, the average time and average cost of problem resolution may be estimated. This technique may optimize the support channel recommendation process, allowing higher customer satisfaction, lower support costs, and support channel recommendations tailored for each webpage or software application utilizing process 200.

At 240, the support channel recommendation may be displayed. The support channel recommendation may be displayed on a user device display screen. In an embodiment, a user device may be a desktop or laptop computer, a mobile phone, a tablet, and/or the like. The support channel recommendation may be displayed by enlarging an icon associated with a support channel, shrinking icons associated with support channels not recommended, using color, movement, or other visual clues to distinguish the support channel recommendation, a combination thereof, and/or the like. The support channel recommendation may arrange a list of support channels, placing the most relevant support channel in a more prominent location.

Referring to FIG. 2B, a block diagram of monitoring user input, preferences, and navigation patterns 210 is shown. Monitoring usage may comprise utilizing several data sources to collect and categorize data. The data sources may be used to generate a user context to identify the best support channel for a user. In an embodiment, data sources may be page context 212, device context 214, user context 216, and customer preference 218. In an embodiment, data sources may be referred to as "context clue tokens" or "requirements tokens." Information from the data sources may be collected at a processor 225 to determine a support channel recommendation.

In an embodiment, a website or software application may utilize process 200 to provide a support channel recommendation to a user. Page context 212 may refer to information collected concerning an underlying website or software application. Page context 212 may comprise information, such as parent page content, page topics, page type, a combination thereof, and/or the like. For example, in an embodiment, page context 212 may provide information signaling that the user is attempting to make a purchase based on the type of website or specific webpage that the user is accessing.

Device context 214 may refer to information collected concerning a user device that is accessing a website or a software application. This information may comprise the device type, such as a desktop or laptop computer or a mobile device, the location of the device or user, the connection speed of the device, the language setting of the device, a combination thereof, and/or the like. The connection speed of the device may comprise the general Internet connection speed of the device, the bandwidth of the device, the connection speed to a specific website or application server, a combination thereof, and/or the like.

User context 216 may refer to information collected concerning the user that is accessing a website or a software application. This information may comprise a Net Promoter Score (NPS), the amount of time the user has spent on a page, the user's browsing history, including any past searches stored in a cache, purchase history, including which products the user currently owns or uses, case history, a combination thereof, and/or the like. In an embodiment, a NPS may be a value that predicts the likelihood of a customer repurchasing from a company or referring business to that company. In an embodiment, a NPS may reflect a metric for defining customer loyalty.

Customer preference 218 may refer to information regarding the status of support channels. In an embodiment, customers may adjust these preferences. In an embodiment, customers may not be able to adjust these preferences. Customer preference 218 may comprise information, such as support channel preference, maximum wait time, detailed ranking rules, agent availability, a combination thereof, and/or the like.

Processor 225 may collect information from page context 212, device context 214, user context 216, and customer preference 218. In an embodiment, processor 225 may utilize this information to apply administrator-defined rules at 220, generate a support channel recommendation at 230, a combination thereof, and/or the like. Processor 225 may comprise a microprocessor produced by microprocessor manufacturers such as Advanced Micro Devices, Inc. (AMD) of Sunnyvale, Calif., Atmel Corporation of San Jose, Calif., Intel Corporation of Santa Clara, Calif., or Texas instruments Inc. of Dallas, Tex. Processor 225 may comprise and/or be other logic-based controllers such as FPGAs or PLCs.

Figure 3A:
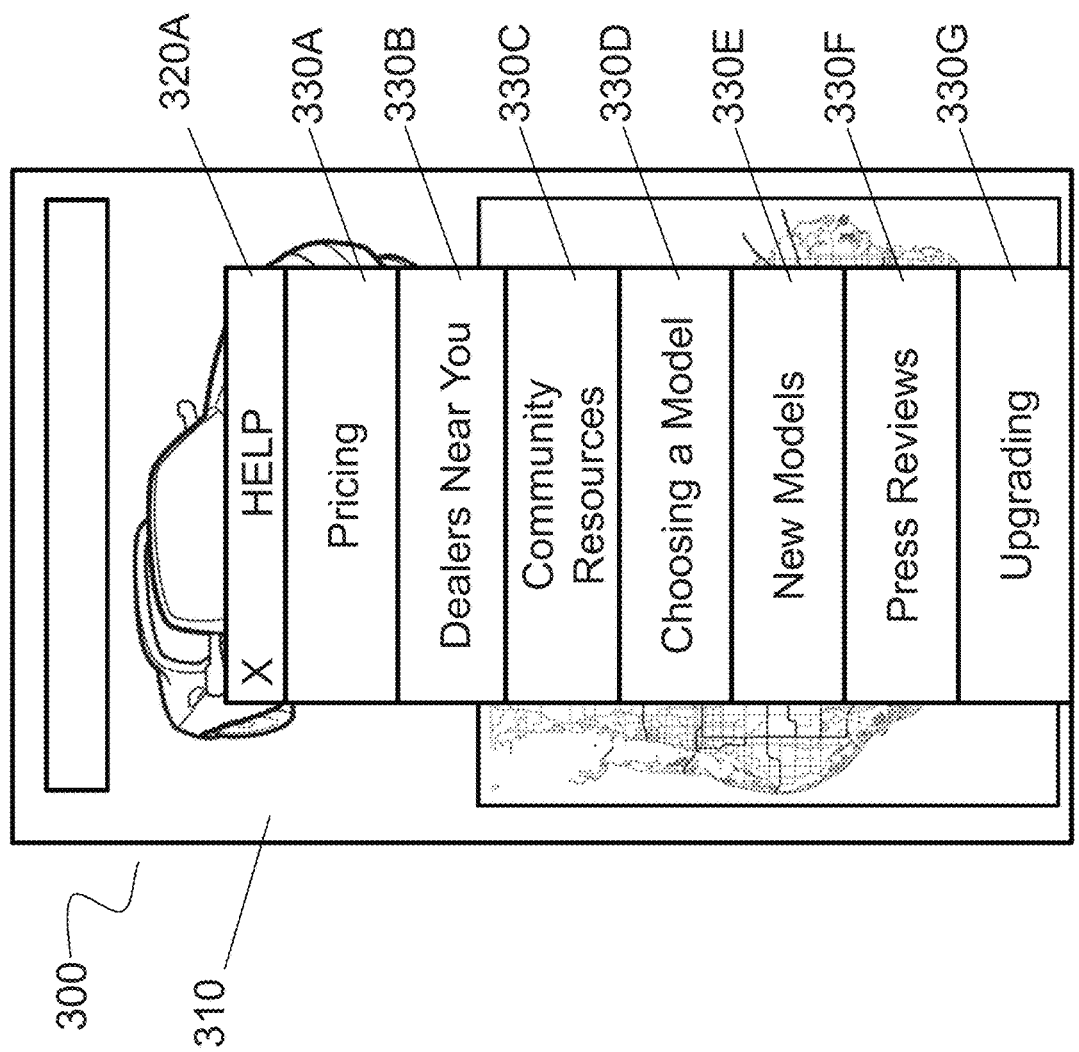
FIG. 3A is a screen display of a graphical user interface comprising content recommendations as per an aspect of an embodiment of the present invention.

Referring to FIG. 3A, a screen display 300 of a graphical user interface comprising content recommendations 330A-330G is shown. According to an embodiment, the screen display 300 may comprise an application screen 310, a help menu widget 320A, and content 330A-330G.

Screen display 300 may be a graphical user interface as displayed on a desktop or laptop computer. Screen display 300 may be displayed on a device with a touch screen interface such as a mobile phone, a tablet, and/or the like. A user may interact with screen display 300 to view content on application screen 310. A user may interact with screen display 300 to utilize help menu widget 320A. A user may interact with screen display 300 to utilize one or more content recommendations 330A-330G.

Screen display 300 may comprise application screen 310. Application screen 310 may display a website, software application, local client desktop interface, a combination thereof, and/or the like. Screen display 300 may comprise help menu widget 320A. In an embodiment, help menu widget 320A may occupy a portion of screen display 300 separate from application screen 310. Help menu widget 320A may be outlined in various orientations such as vertical, horizontal, diagonal, a combination thereof, and/or the like. In an embodiment, help menu widget 320A may overlay on top of application screen 310. In an embodiment, help menu widget 320A may not be a specific portion of screen display 300 but may instead refer to collective content recommendations 330A-330G regardless of the position of the content recommendations 330A-330G. In an embodiment, help menu widget 320A may be installed into the underlying website, software application, or local client desktop interface displayed on application screen 310. In this embodiment, developers of the underlying website, software application, or local client desktop interface would add the widget to existing website or software code. In an embodiment, help menu widget 320A may be installed on a user device displaying screen display 300 and overlay on top of application screen 310.

Help menu widget 320A may comprise several content recommendations 330A-330G. While FIG. 3A depicts seven content recommendations, help menu widget 320A may comprise more or less than seven content recommendations. The content recommendations may be an article, webpage, guide, blog post, FAQ, video, audio explanation, or any other medium that aids a user in solving a problem. For example, in an embodiment where the user may be contemplating a car purchase, content recommendations 330A-330G may comprise articles related to pricing, dealership location, community resources, help with choosing model, a listing of new models, press reviews, possible upgrade alternatives, a combination thereof, and/or the like. In an embodiment, content recommendations 330A-330G may comprise icons, tiles, bars, a combination thereof, and/or the like displayed on screen display 300. In an embodiment, users may utilize and select a content recommendation to gain access to an associated page for self-service troubleshooting. In an embodiment, content recommendations 330A-330G are grouped together on screen display 300. In an embodiment, content recommendations 330A-330G are dispersed throughout screen display 300.

Figure 3B:
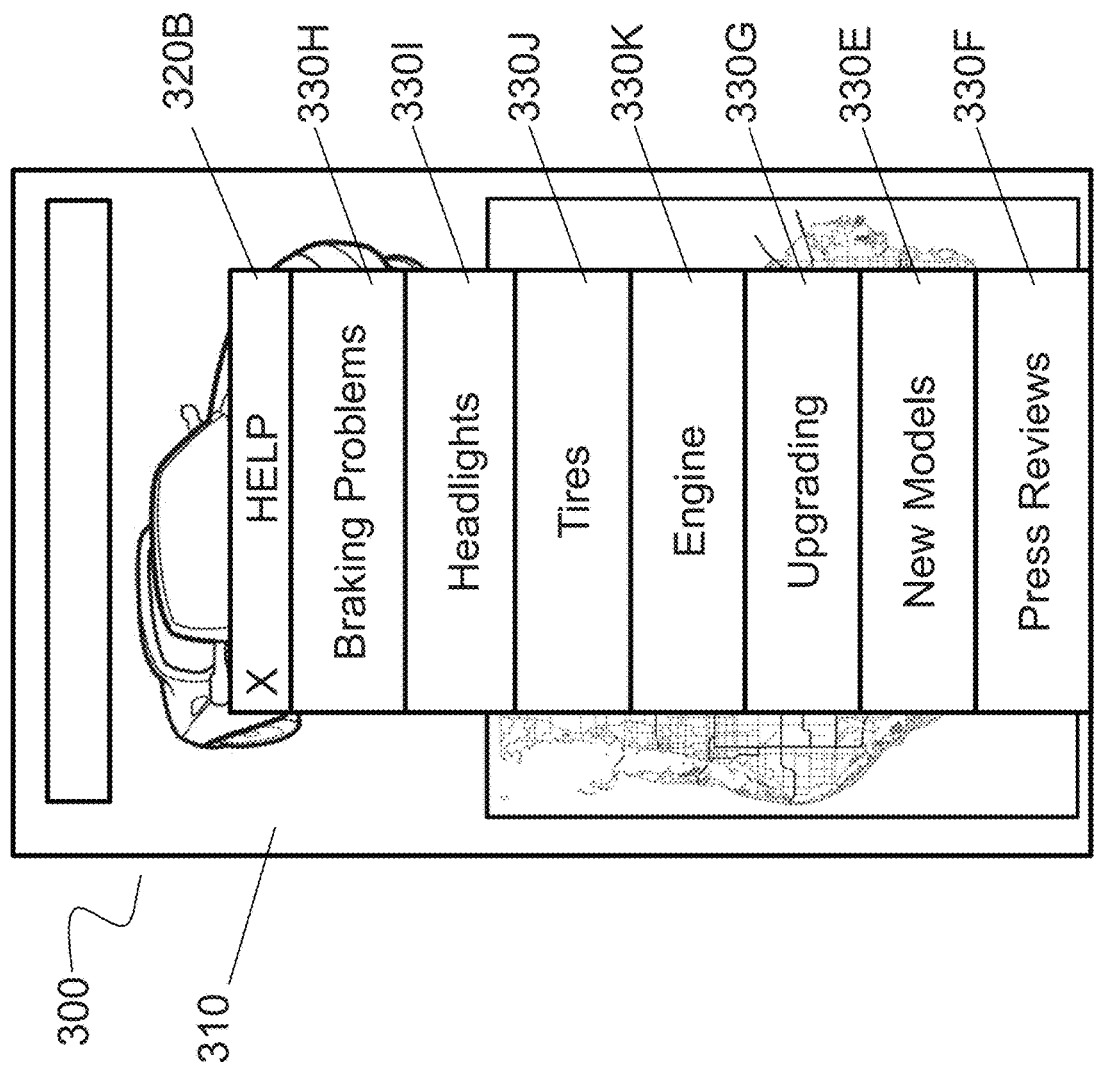
FIG. 3B is a screen display of a graphical user interface comprising content recommendations as per an aspect of an embodiment of the present invention.

Referring to FIG. 3B, a screen display 300 of a graphical user interface comprising content recommendations 330E-330K shown. According to an embodiment, the screen display 300 may comprise an application screen 310, a help menu widget 320B, and content recommendations 330E-330K. In an embodiment, help menu widget 320B may differ from help menu widget 320A in terms of displaying different content recommendations. Determining which content to recommend is further described in FIG. 4A and FIG. 4B.

Figure 4A:
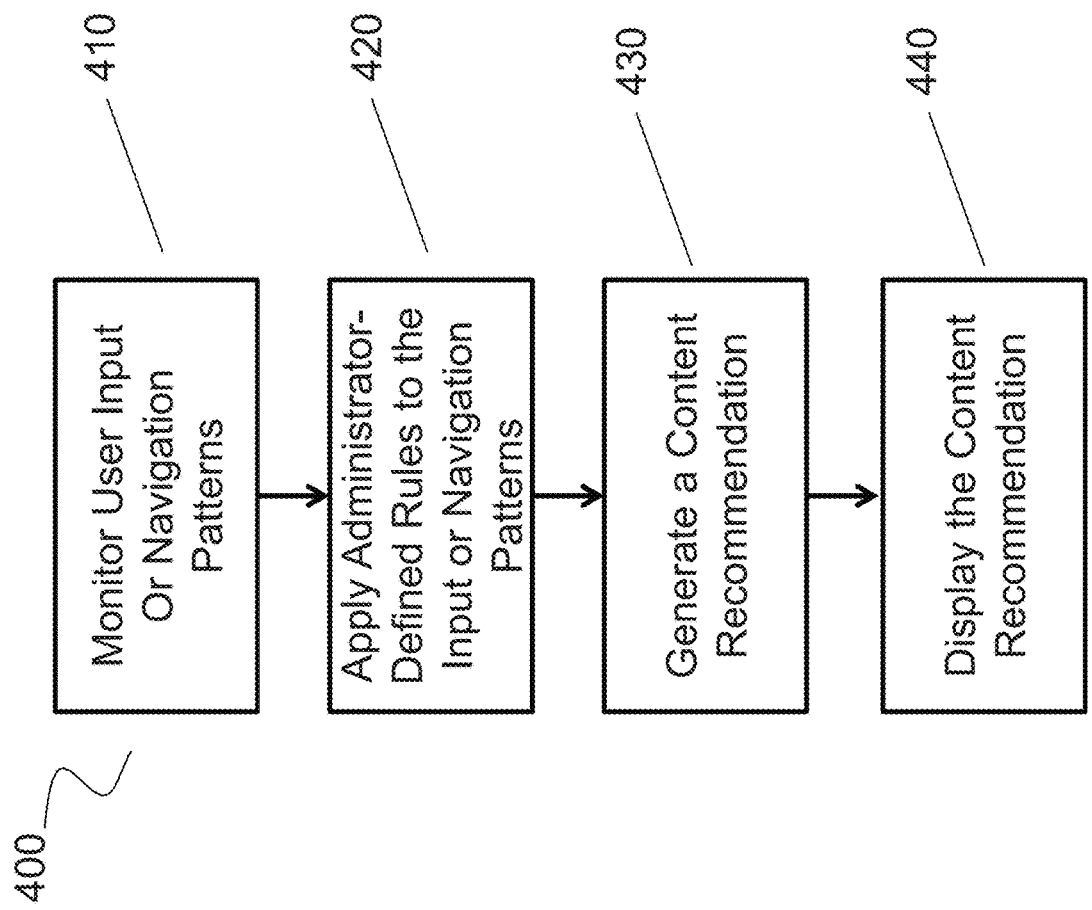
FIG. 4A is a flow diagram of a content recommendation process as per an aspect of an embodiment of the present invention.
Figure 4B:
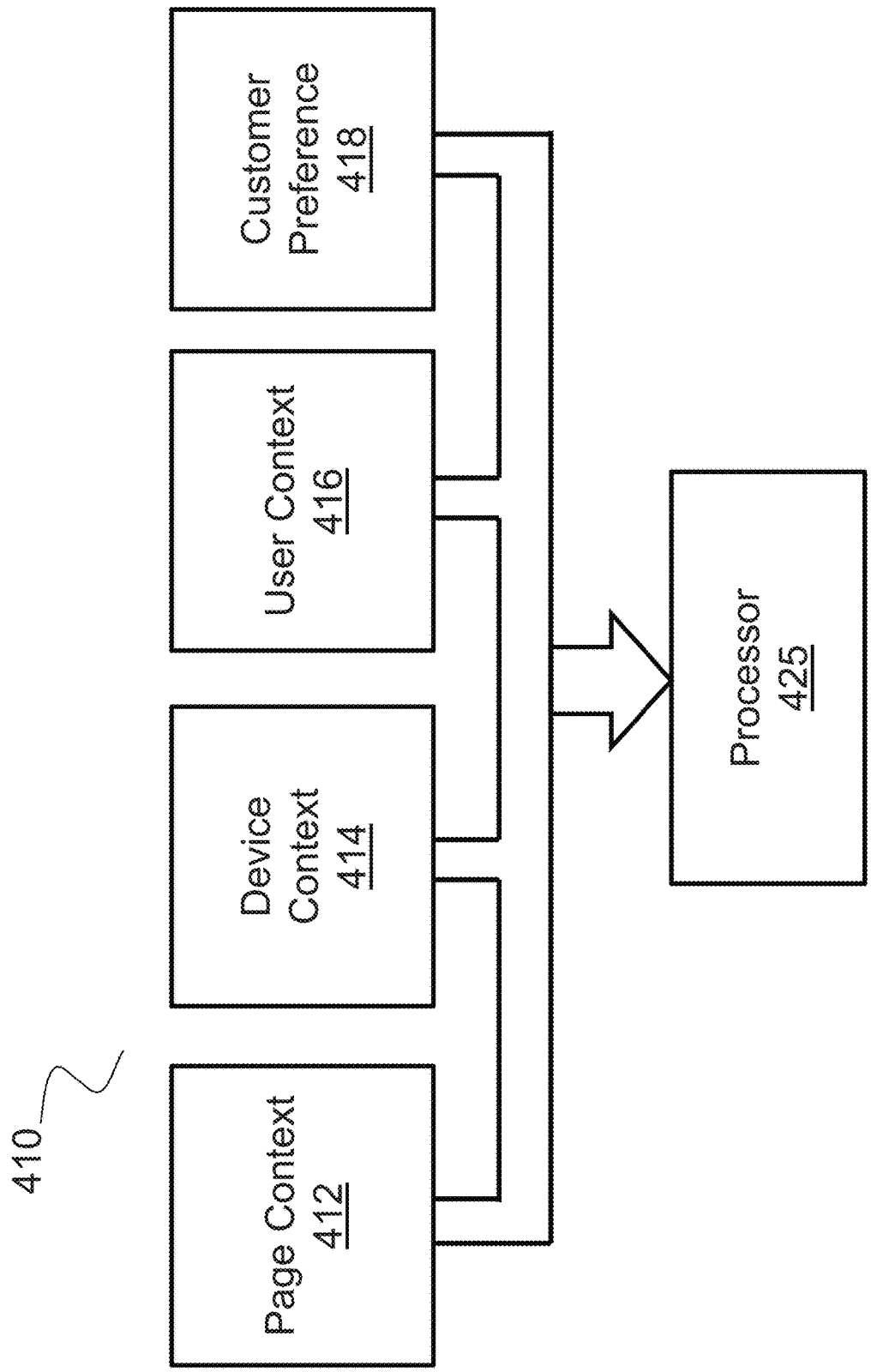
FIG. 4B is a block diagram of system interaction as per an aspect of an embodiment of the present invention.

In an embodiment, help menu widget 320B may list different content recommendations compared to help menu widget 320A due to different user-dependent navigation patterns. For example, in an embodiment where a user may be contemplating a car purchase, help menu widget 320A may be displayed. In an embodiment where the user may already own a car and is instead researching repair option, help menu widget 320B may be displayed. In an embodiment, help menu widget 320B may comprise content recommendations 330E-330K, which may comprise articles related to braking problems, new headlight purchases, tire purchases, engine problems, upgrading, a list of new models, press reviews, a combination thereof, and/or the like. In an embodiment, help menu widget 320B may arrange the content recommendations according to the content most relevant to the user. For example, in an embodiment where a user already owns a car, help menu widget 320B may arrange service content as more prominent while arranging new car purchase content as less prominent. In an embodiment, different users may be presented with different content recommendations, such as between help menu widget 320A and 320B. In an embodiment, some content recommendations, such as content recommendations 330E-330G, may overlap between help menu widget 320A and 320B. In an embodiment, although different users may be viewing the same application screen 310 on their respective screen displays 300, the users may still receive different content recommendations. FIG. 4A and FIG. 4B describe an embodiment of a process for determining content recommendation.

Referring to FIG. 4A, a flow diagram of content recommendation process 400 is shown. In an embodiment, a website or software application may utilize process 400 to provide a content recommendation to a user. According to an embodiment, user inputs, preferences, navigation patterns, a combination thereof, and/or the like may be monitored at 410. FIG. 4B further details the monitoring at 410.

At 420, administrator-defined rules may be applied to the input, preferences, or navigation patterns monitored at 410. In an embodiment, administrator-defined rules may be implemented in an existing software application external to content recommendation process 400. Applying administrator-defined rules at 420 may utilize rules defined by administrators or developers of websites or software applications. Administrators or developers may utilize content recommendation process 400 to recommend content to users of their websites or software applications.

In applying administrator-defined rules at 420, certain content rules may be implemented, regarding information such as the credentials of the author of the content, how recently the content was published, the number of upvotes by end-users, recorded success metrics such as articles correlated with successful resolution, a combination thereof, and/or the like.

In an embodiment, administrators or developers may define limitations on which pieces of content are available to certain persona groups. For example, some pieces of content may be targeted toward users thinking of buying a product while other pieces of content may be targeted to those who already own the product. This embodiment allows administrators or developers to segregate which articles are recommended to which users.

In an embodiment, administrators or developers may define categories for different aspects of the website or software application as well as categories for each piece of content. This embodiment allows administrators or developers to create a mapping of types of contents and determine which content should be recommended to a user.

At 420, the administrator-defined rules may be adjustable. The administrator-defined rules may emphasize or de-emphasize content that may or may not be recommended to a user. In an embodiment, an administrator or developer may alter specific segments of program instructions or code to adjust the administrator-defined rules. In an embodiment, an administrator or developer may utilize a separate graphical user interface to adjust the administrator-defined rules. These rules may or may not be available for a user to adjust. In an embodiment, a subset of the rules may be available to a user to adjust. In an embodiment, the administrator-defined rules may be adjustable remotely. For example, an administrator or developer may be able to adjust the rules without the need to physically connect to the user device. In an embodiment, updated administrator-defined rules may be downloaded by a user device.

At 430, content recommendation may be generated. Based on the application of administrator-defined rules at 420, content ranking may be generated at 430. In an embodiment, the content recommendation may be generated by highlighting the single most relevant piece of content based on the ranking of available content. In an embodiment, the content recommendation may comprise multiple pieces of content based on the ranking. For example, the content recommendation may comprise the two highest ranked pieces of content based on the application of the administrator-defined rules.

In an embodiment, 430 may also record information relevant to generating a content recommendation. This information may be utilized in future content recommendations with the same or with a different user. Information that may be recorded may comprise: content popularity, content ranking, whether the content is being promoted by a company, the category of the content, the category of the underlying webpage or software application screen, the persona group of the user, a combination thereof, and/or the like. This information may be considered at 430 when determining which content to recommend. In an embodiment, each piece of content will have an average set of values after information is gathered. For example, if a user of a certain persona group is browsing a certain category of pages and is using a certain device, a certain content recommendation may be generated based on the category of content and how well the piece of content satisfies the rules defined at 420.

At 440, the content recommendation may be displayed. The content recommendation may be displayed on a user device display screen. In an embodiment, a user device may be a desktop or laptop computer, a mobile phone, a tablet, and/or the like. The content recommendation may be displayed by enlarging an icon associated with a piece of content, shrinking icons associated with pieces of content not recommended, using color, movement, or other visual clues to distinguish the content recommendation, a combination thereof, and/or the like. The content recommendation may arrange a list of content, placing the most relevant content in a more prominent location.

Referring to FIG. 4B, a block diagram of monitoring user input, preferences, and navigation patterns 410 is shown. Monitoring usage may comprise utilizing several data sources to collect and categorize data. The data sources may be used to generate a user context to identify the best content recommendation for a user. In an embodiment, data sources may be page context 412, device context 414, user context 416, and customer preference 418. In an embodiment, data sources may be referred to as "context clue tokens" or "requirements tokens." Information from the data sources may be collected at a processor 425 to determine a content recommendation.

In an embodiment, a website or software application may utilize process 400 to provide a content recommendation to a user. Page context 412 may refer to information collected concerning an underlying website or software application. Page context 412 may comprise information, such as parent page content, page topics, page type, a combination thereof, and/or the like. For example, in an embodiment, page context 412 may provide information signaling that the user is attempting to make a purchase based on the type of website or specific webpage that the user is accessing.

Device context 414 may refer to information collected concerning a user device that is accessing a website or a software application. This information may comprise the device type, such as a desktop or laptop computer or a mobile device, the location of the device or user, the connection speed of the device, the language setting of the device, a combination thereof, and/or the like. The connection speed of the device may comprise the general Internet connection speed of the device, the bandwidth of the device, the connection speed to a specific website or application server, a combination thereof, and/or the like.

User context 416 may refer to information collected concerning the user that is accessing a website or a software application. This information may comprise a Net Promoter Score (NPS), the amount of time the user has spent on a page, the user's browsing history, including any past searches stored in a cache, purchase history, including which products the user currently owns or uses, case history, a combination thereof, and/or the like. In an embodiment, a NPS may be a value that predicts the likelihood of a customer repurchasing from a company or referring business to that company. In an embodiment, a NPS may reflect a metric for defining customer loyalty.

Customer preference 418 may refer to information regarding the status of support channels. In an embodiment, customers may adjust these preferences. In an embodiment, customers may not be able to adjust these preferences. Customer preference 418 may comprise information, such as content preference, content ranking, content popularity, content category, content keyword associations, a combination thereof, and/or the like.

Processor 425 may collect information from page context 412, device context 414, user context 416, and customer preference 418. In an embodiment, processor 425 may utilize this information to apply administrator-defined rules at 420, generate a content recommendation at 430, a combination thereof, and/or the like. Processor 425 may comprise a microprocessor produced by microprocessor manufacturers such as Advanced Micro Devices, Inc. (AMD) of Sunnyvale, Calif., Amid Corporation of San Jose. Calif., Intel Corporation of Santa Clara, Calif., or Texas Instruments Inc. of Dallas, Tex. Processor 425 may comprise and/or be other logic-based controllers such as FPGAs or PLCs.

Figure 5:
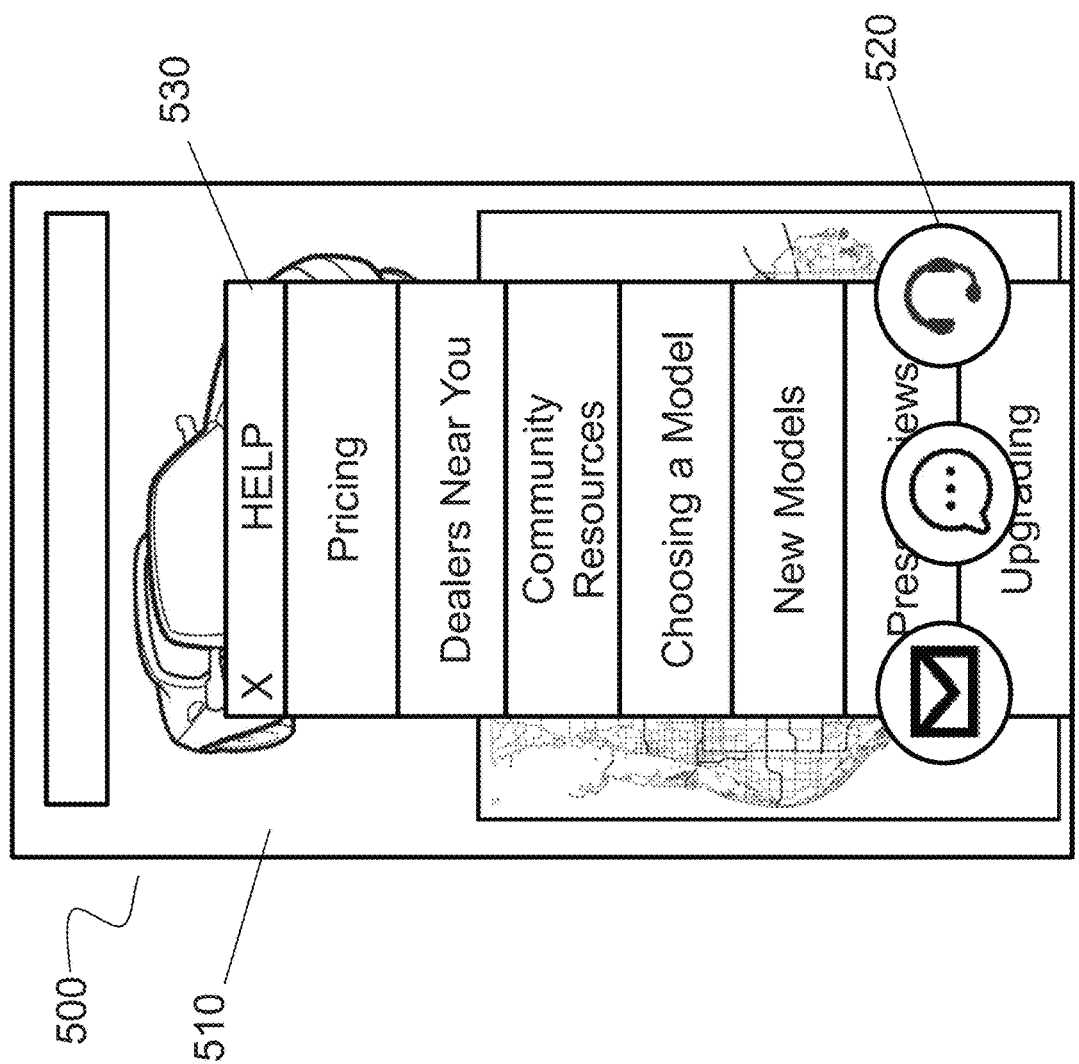
FIG. 5 is a screen display of a graphical user interface comprising support channel and content recommendations as per an aspect of an embodiment of the present invention.

Referring to FIG. 5, a screen display 500 of a graphical user interface comprising support channel recommendations 520 and content recommendations 530 is shown. According to an embodiment, the screen display 500 may comprise an application screen 510. Application screen 110 may display a website, software application, local client desktop interface, a combination thereof, and/or the like.

In an embodiment, support channel recommendations 520 and content recommendations 530 may overlay on top of application screen 510. In an embodiment, support channel recommendations 520 may overlay on top of content recommendation 530. In an embodiment, support channel recommendations 520 may comprise icons, tiles, bars, a combination thereof, and/or the like displayed on screen display 500. In an embodiment, content recommendations 530 may comprise icons, tiles, bars, a combination thereof, and/or the like displayed on screen display 500. In an embodiment, either support channel recommendations 520, content recommendations 530, or both may initially not appear on screen display 500. In an embodiment, if a triggering event occurs, either support channel recommendations 520, content recommendations 530, or both may appear on screen display 500, A triggering event may comprise selecting an indicator on application screen 510 to reveal either support channel recommendations 520, content recommendations 530, or both, the elapsing of a predefined amount of time, browsing to a specific web or software page, swiping a user indicator, such as a mouse point or finger, moving the user device, a combination thereof and/or the like.

Figure 6A:
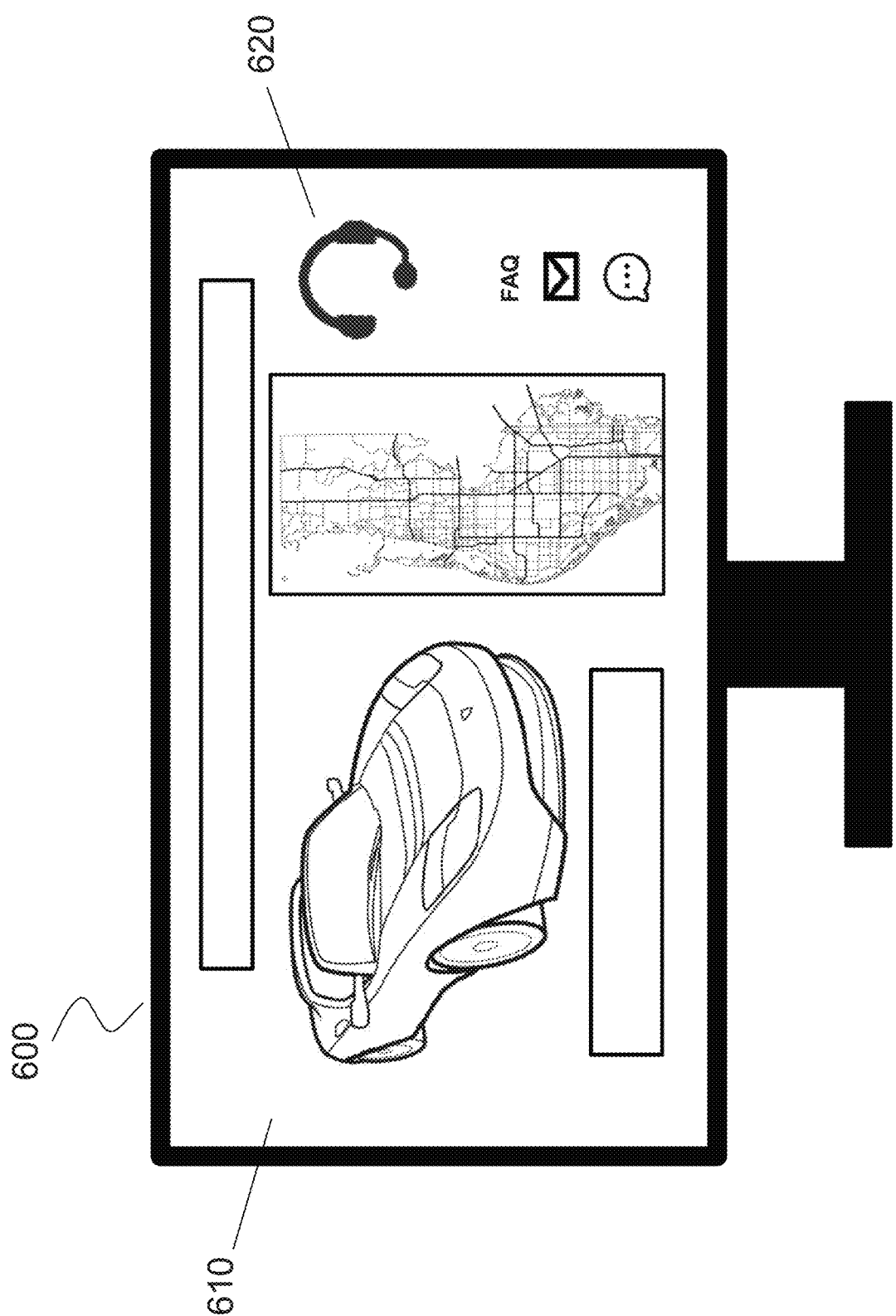
FIG. 6A is a system diagram of a screen display comprising video assistance as per an aspect of an embodiment of the present invention.

Referring to FIG. 6A, a screen display 600 comprising video assistance is shown. According to an embodiment, the screen display 600 may comprise an application screen 610 and a support channel recommendation 620. In an embodiment, application screen 610 may display a website, software application, local client desktop interface, a combination thereof, and/or the like. In an embodiment, support channel recommendation 620 may comprise a video chat channel. Support channel recommendation 620 may be promoted by enlarging the icon associated with video chat channel.

Figure 6B:
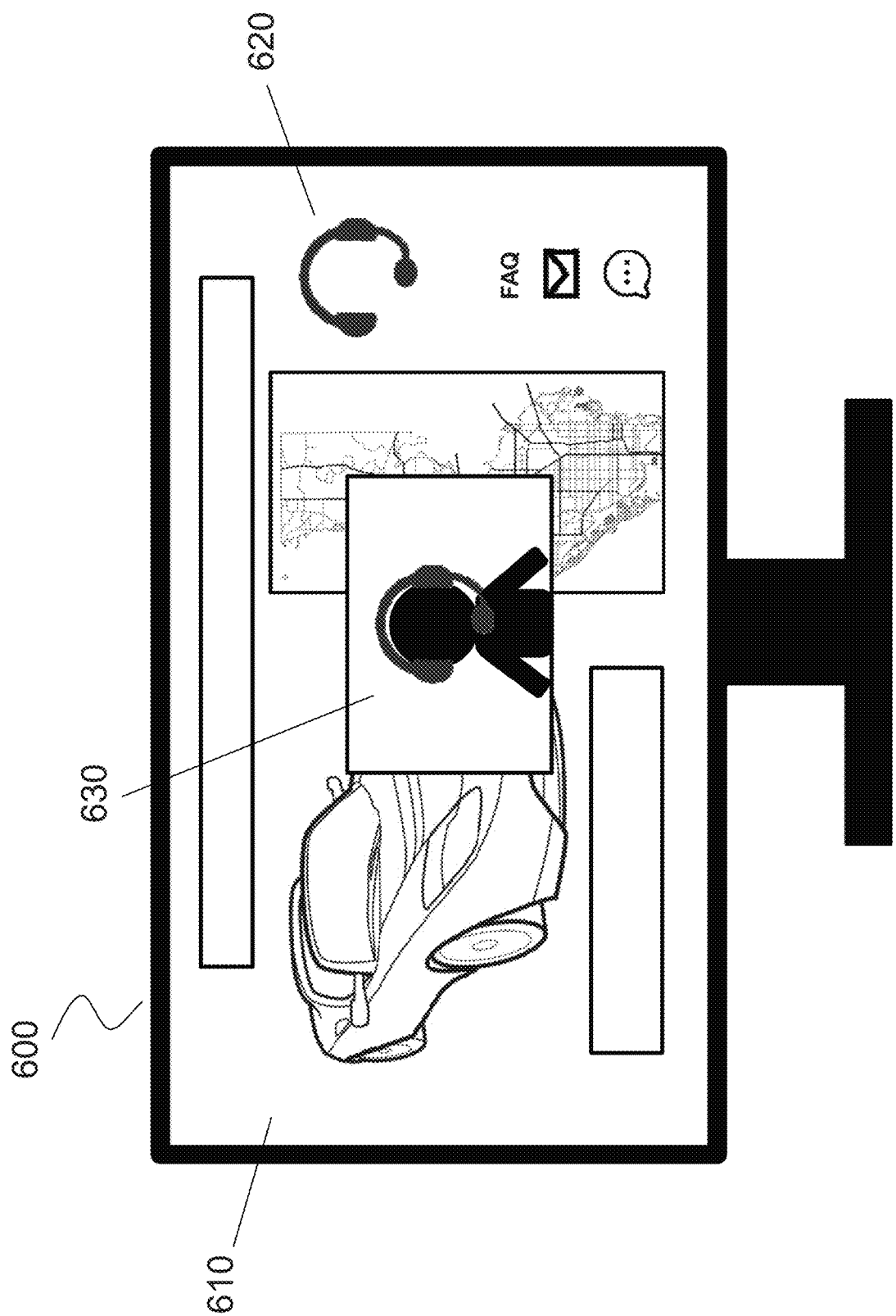
FIG. 6B is a system diagram of a screen display comprising video assistance as per an aspect of an embodiment of the present invention.

Referring to FIG. 6B, a screen display 600 comprising video assistance is shown. According to an embodiment, the screen display 600 may comprise an application screen 610, a support channel recommendation 620, and a video chat channel 630. In an embodiment, video chat channel 630 may initially not appear on screen display 600. In an embodiment, if a triggering event occurs, video chat channel 630 may appear on screen display 600. A triggering event may comprise selecting an indicator on application screen 610, such as support channel recommendation 620, the elapsing of a predefined amount of time, browsing to a specific web or software page, swiping a user indicator, such as a mouse point or finger, moving the user device, a combination thereof, and/or the like.

Figure 6C:
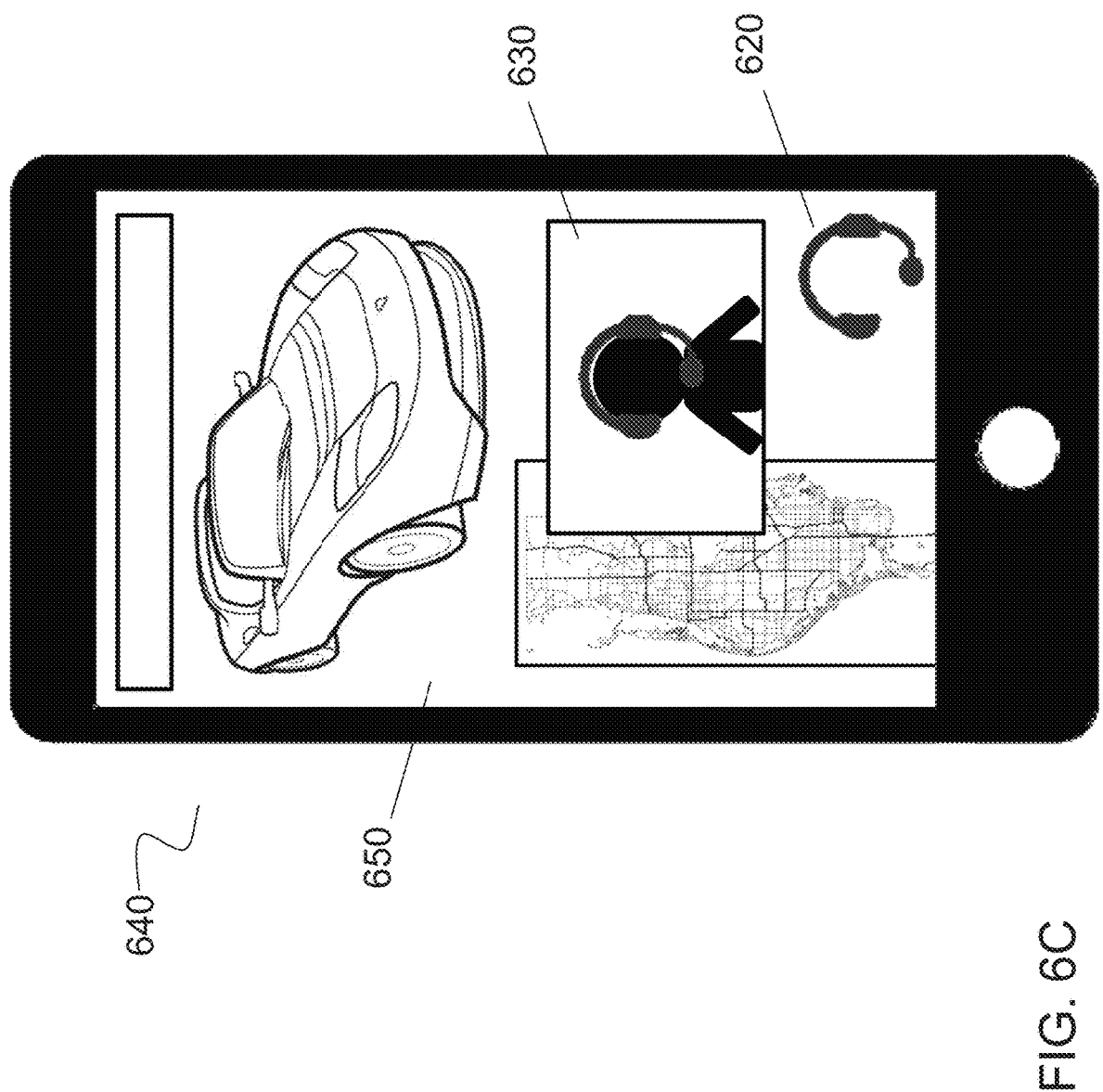
FIG. 6C is a system diagram of a screen display comprising video assistance as per an aspect of an embodiment of the present invention.

Referring to FIG. 6C, a screen display 640 comprising video assistance is shown. According to an embodiment, the screen display 640 may comprise an application screen 650, a support channel recommendation 620, and a video chat channel 630. In an embodiment, screen display 640 may be displayed on a mobile device such as a phone or tablet. Referring to FIG. 6A and FIG. 6B, screen display 600 may be displayed on a larger screen such as a desktop or laptop monitor. In an embodiment, a user may first peruse application screen 610. The user may then utilize support channel recommendation 620 to view video chat channel 630 on screen display 600. After interacting with video chat channel 630 on screen display 600, video chat channel 630 may be transferred to screen display 640. In an embodiment, the user chooses to transfer video chat channel 630. In an embodiment, a third-party agent, website, or software application may transfer the live chat channel.

In an embodiment, the user may first peruse application screen 650 on screen display 640. The user may then utilize support channel recommendation 620 to view video chat channel 630 on screen display 640. After interacting with video chat channel 630 on screen display 640, video chat channel 630 may be transferred to screen display 600. In an embodiment, the user chooses to transfer video chat channel 630. In an embodiment, a third-party agent, website, or software application transfers video chat channel 630. In an embodiment, application screen 650 may display the same or substantially similar content to application screen 610.

Figure 7A:
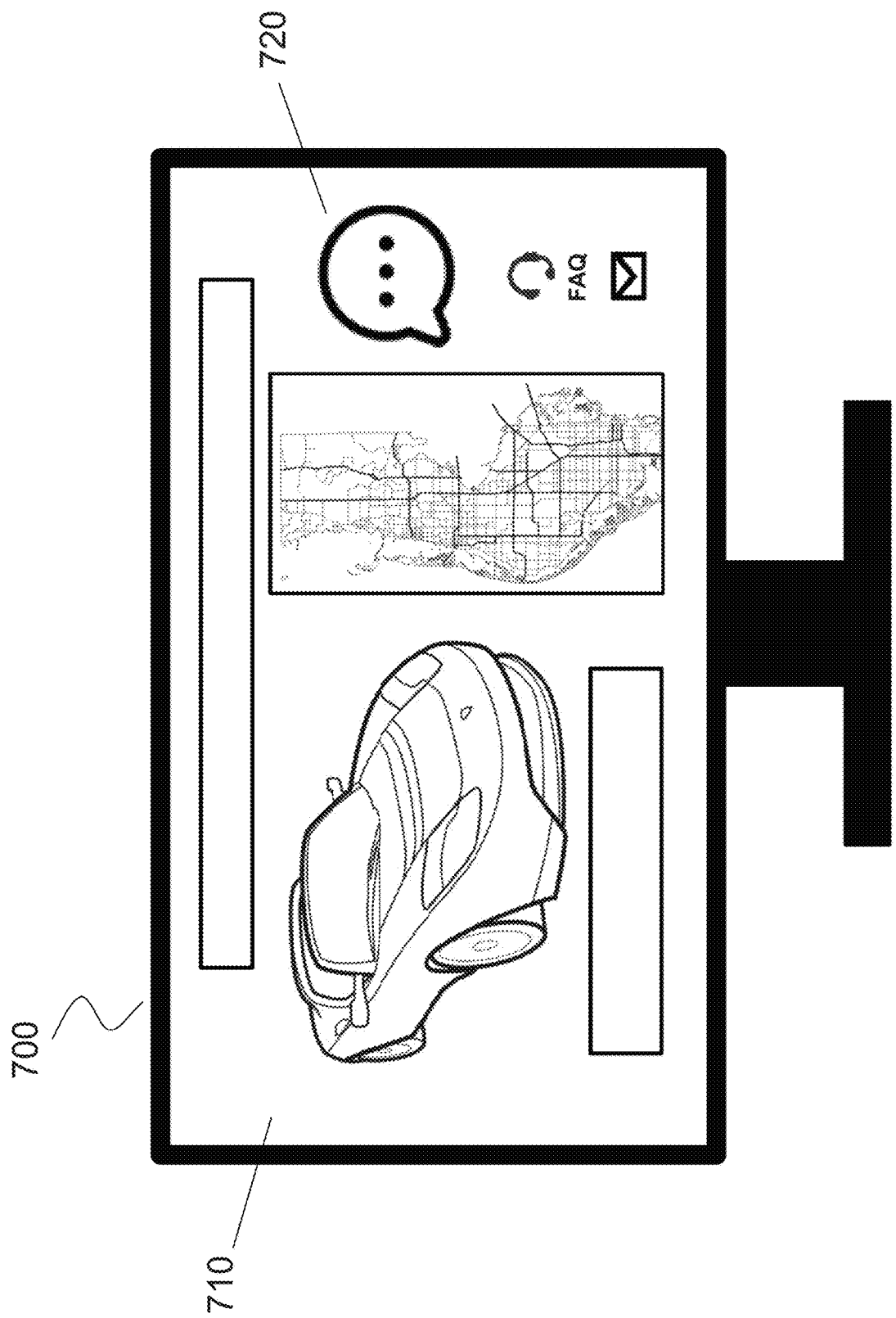
FIG. 7A is a system diagram of a screen display comprising live chat assistance as per an aspect of an embodiment of the present invention.

Referring to FIG. 7A, a screen display 700 comprising live chat assistance is shown. According to an embodiment, the screen display 700 may comprise an application screen 710 and a support channel recommendation 720. In an embodiment, application screen 710 may display a website, software application, local client desktop interface, a combination thereof, and/or the like. In an embodiment, support channel recommendation 720 may comprise a live chat channel. Support channel recommendation 720 may be promoted by enlarging the icon associated with video chat channel.

Figure 7B:
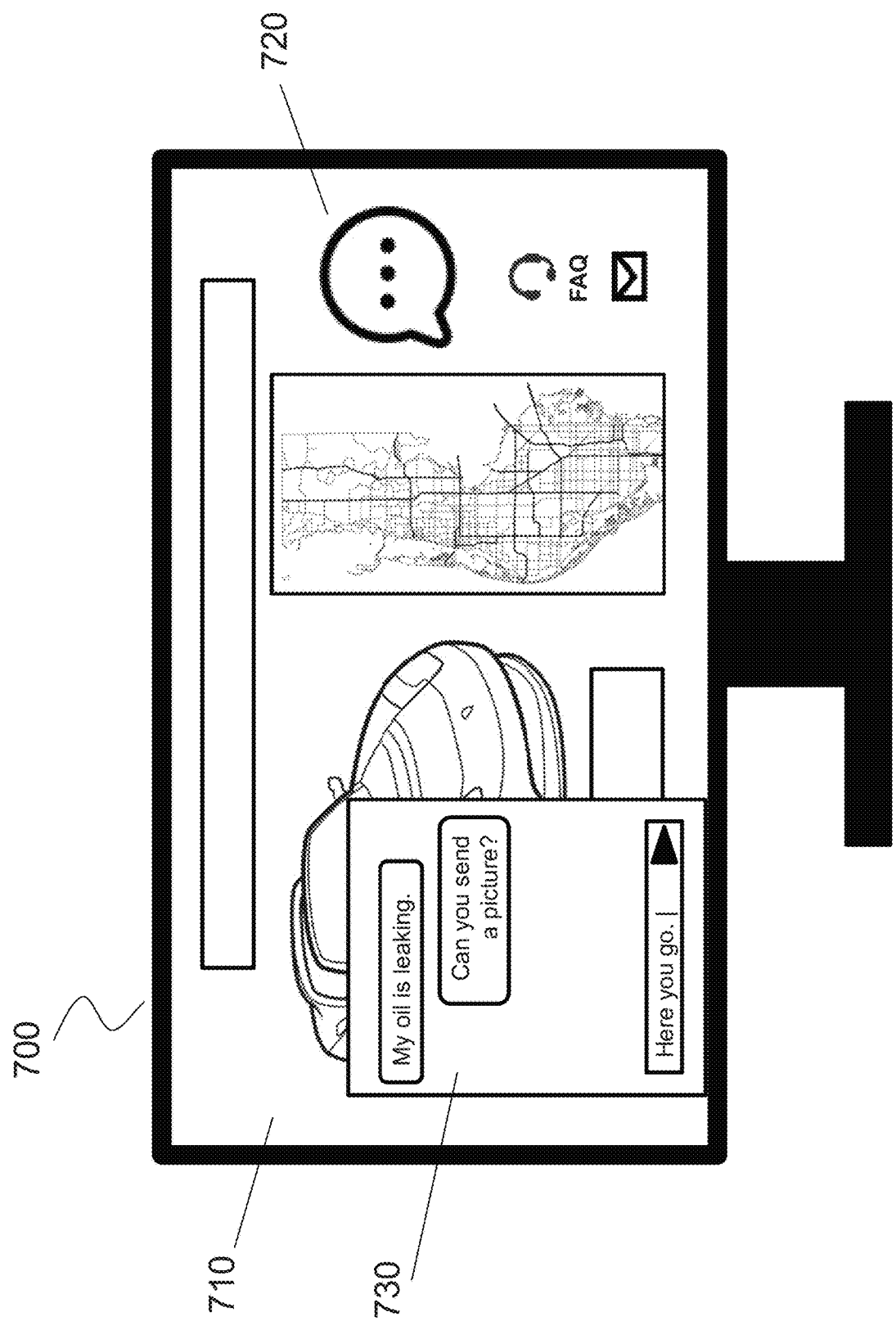
FIG. 7B is a system diagram of a screen display comprising live chat assistance as per an aspect of an embodiment of the present invention.

Referring to FIG. 7B, a screen display 700 comprising live chat assistance is shown. According to an embodiment, the screen display 700 may comprise an application screen 710, a support channel recommendation 720, and a live chat channel 730. In an embodiment, live chat channel 730 may initially not appear on screen display 700. In an embodiment, if a triggering event occurs, live chat channel 730 may appear on screen display 700. A triggering event may comprise selecting an indicator on application screen 710, such as support channel recommendation 720, the elapsing of a predefined amount of time, browsing to a specific web or software page, swiping a user indicator, such as a mouse point or finger, moving the user device, a combination thereof, and/or the like.

Figure 7C:
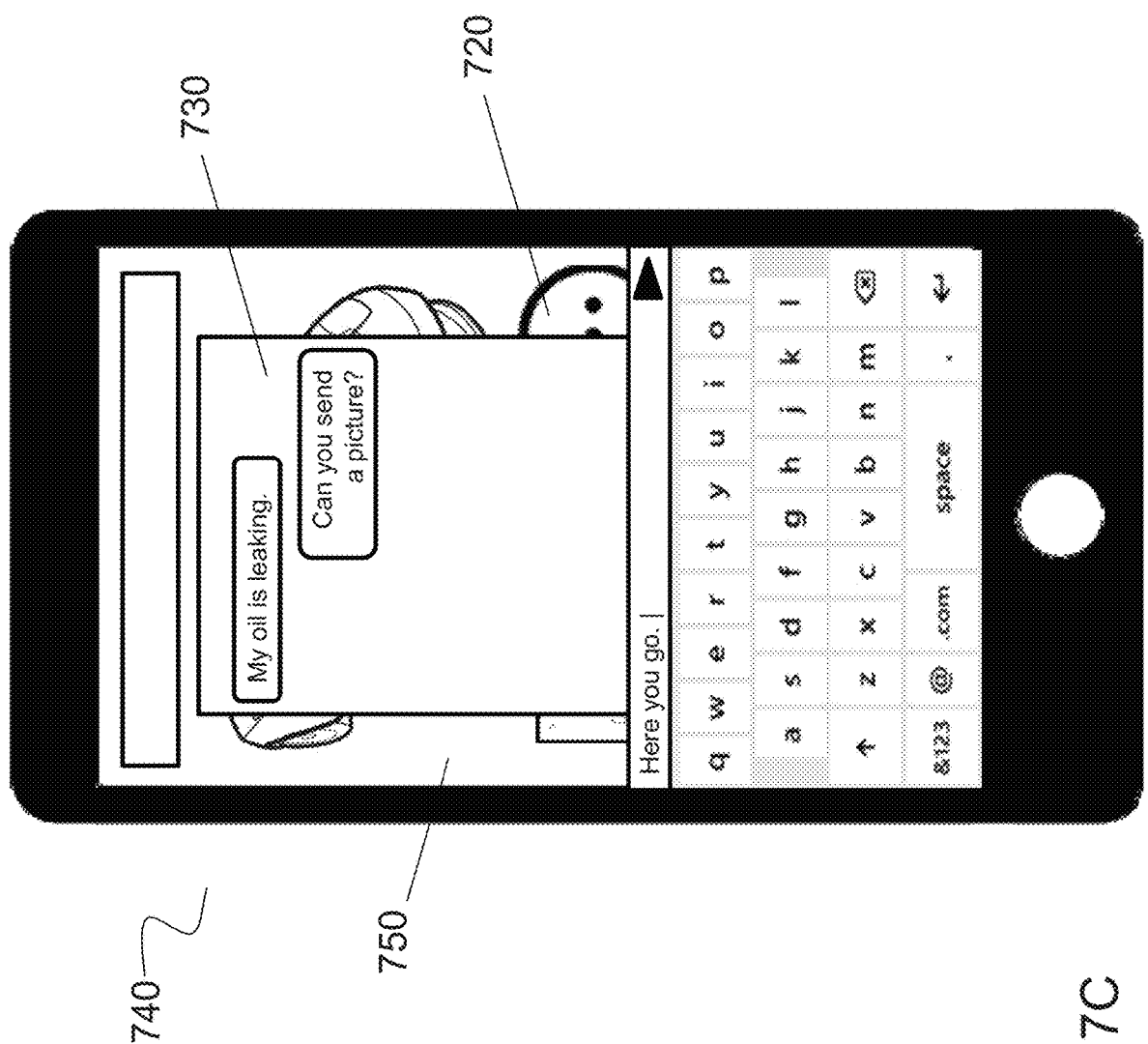
FIG. 7C is a system diagram of a screen display comprising live chat assistance as per an aspect of an embodiment of the present invention.

Referring to FIG. 7C, a screen display 740 comprising live chat assistance is shown. According to an embodiment, the screen display 740 may comprise an application screen 750 and a live chat channel 730. In an embodiment, screen display 740 may be displayed on a mobile device such as a phone or tablet. Referring to FIG. 7A and FIG. 7B, screen display 700 may be displayed on a larger screen such as a desktop or laptop monitor. In an embodiment, a user may first peruse application screen 710. The user may then utilize support channel recommendation 720 to view live chat channel 730 on screen display 700. After interacting with live chat channel 730 on screen display 700, live chat channel 730 may be transferred to screen display 740. In an embodiment, the user chooses to transfer live chat channel 730. In an embodiment, a third-party agent, website, or software application may transfer the live chat channel.

In an embodiment, the user may first peruse application screen 750 on screen display 740. The user may then utilize support channel recommendation 720 to view live chat channel 730 on screen display 740. After interacting with live chat channel 730 on screen display 740, live chat channel 730 may be transferred to screen display 700. In an embodiment, the user chooses to transfer live chat channel 730. In an embodiment, a third-party agent, website, or software application transfers live chat channel 730. In an embodiment, application screen 750 may display the same or substantially similar content to application screen 710.

Figure 8:
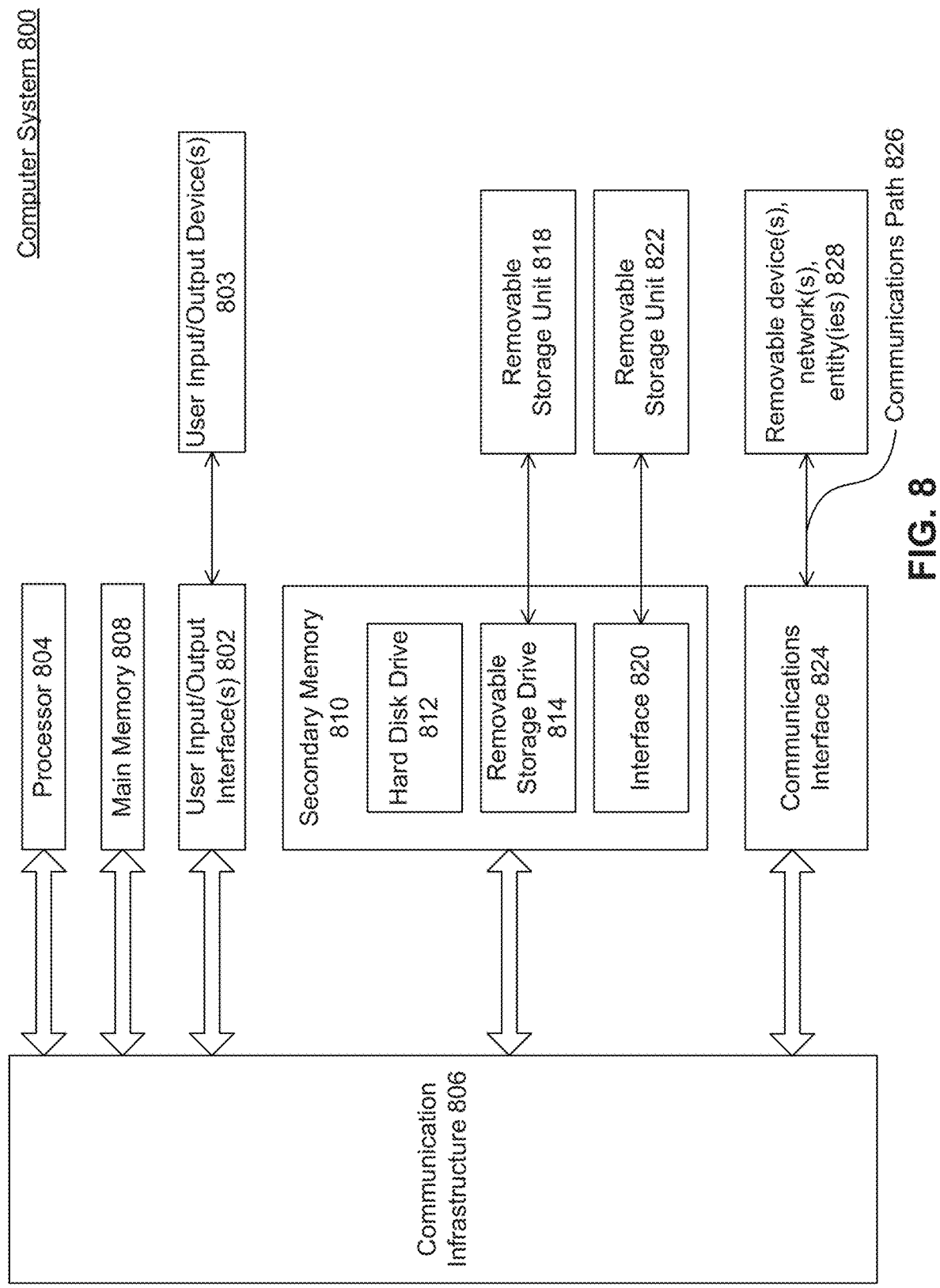
FIG. 8 is air example computer system useful for implementing various embodiments.

Various embodiments can be implemented, for example, using one or more computer systems, such as computer system 800 shown in FIG. 8. Computer system 800 may be used, for example, to implement method 200 of FIG. 2A or to implement method 400 of FIG. 4A. For example, computer system 800 may monitor user input, preferences, or navigation patterns. Computer system 800 may further apply administrator-defined rules to the user input, preferences, or navigation patterns and generate a support channel or content recommendation, according to some embodiments. Computer system 800 can be any computer capable of performing the functions described herein.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
   recording, by a first application, one or more interactions with a second application, the one or more interactions being performed by a user, wherein the first application is concurrently displayed with the second application in a graphical user interface (GUI) on a client device;
   recording, by the first application, context information related to the second application;
   selecting a customer service application from a plurality of customer service applications, wherein the selecting is based on a preferred order from which to select the customer service application, the recorded one or more interactions, and the recorded context information, and wherein the preferred order is provided by an administrator of a website server that provides the plurality of customer service applications, wherein the administrator defines the preferred order by defining one or more rules that are independent of usage of the client device by the user, wherein the defining of the preferred order by the administrator is performed via a user interface on a device separate from the client device, and wherein the website server is different than the client device, and wherein the administrator is different than the user;

generating, on the GUI and by the first application, a visual indicator for the selected customer service application;

causing display, on the GUI and by the first application, of the visual indicator for the selected customer service application on the second application;

identifying an interaction with the visual indicator on the GUI; and in response to identifying the interaction with the visual indicator, forming, by the first application, a customer service communication channel between the GUI and the website server remote from the GUI to provide assistance with operating the second application via the selected customer service application corresponding to the visual indicator.

2. The computer-implemented method of claim 1, wherein the plurality of customer service applications includes a video chat channel.

3. The computer-implemented method of claim 1, wherein the plurality of customer service applications are pieces of content.

4. The computer-implemented method of claim 1, wherein the context information includes page information associated with the second application.

5. The computer-implemented method of claim 1, wherein the context information includes specification information associated with a computer device instantiating the first application.

6. The computer-implemented method of claim 1, wherein the context information includes a timestamp associated with the one or more interactions.

7. The computer-implemented method of claim 1, further comprising comparing customer service application status information with the recorded context information to select the customer service application.

8. The computer-implemented method of claim 1, wherein generating the visual indicator includes enlarging a graphical icon representative of a customer service application.

9. The computer-implemented method of claim 1, further comprising transmitting the visual indicator from a first computing device to a second computing device.

10. A system, comprising:
a website server; and
a client device comprising a memory and at least one processor coupled to the memory, and wherein the website server and the at least one processor are configured to:
record, by a first application, one or more interactions with a second application, the one or more interactions being performed by a user, wherein the first application is concurrently displayed with the second application in a graphical user interface (GUI) on the client device;
record, by the first application, context information related to the second application;
select a customer service application from a plurality of customer service applications, wherein the selecting is based on a preferred order from which to select the customer service application, the recorded one or more interactions, and the recorded context information, and wherein the preferred order is provided by an administrator of the website server that provides the plurality of customer service applications, and wherein the administrator defines the preferred order by defining one or more rules that are independent of usage of the client device by the user, and wherein the defining of the preferred order by the administrator is performed via a user interface on a device separate from the client device, and wherein the website server is different than the client device, and wherein the administrator is different than the user;
generate, on the GUI and by the first application, a visual indicator for the selected customer service application;
cause display, on the GUI and by the first application, of the visual indicator for the selected customer service application on the second application;
identify an interaction with the visual indicator on the GUI; and
in response to identifying the interaction with the visual indicator, form, by the first application, a customer service communication channel between the GUI and the website server remote from the GUI to provide assistance with operating the second application via the selected customer service application corresponding to the visual indicator.

11. The system of claim 10, wherein the plurality of customer service applications includes a video chat channel.

12. The system of claim 10, wherein the plurality of customer service applications are pieces of content.

13. The system of claim 10, wherein the context information includes page information associated with the second application.

14. The system of claim 10, wherein the context information includes specification information associated with a computer device instantiating the first application.

15. The system of claim 10, wherein the context information includes a timestamp associated with the one or more interactions.

16. The system of claim 10, wherein the at least one processor is further configured to compare customer service application status information with the recorded context information to select the customer service application.

17. The system of claim 10, wherein generating the visual indicator includes enlarging a graphical icon representative of a customer service application.

18. The system of claim 10, further comprising transmitting the visual indicator from a first computing device to a second computing device.

19. At least one tangible, non-transitory computer-readable device having instructions stored thereon that, when executed by at least one computing device, causes the at least one computing device to perform operations comprising:

recording, by a first application, one or more interactions with a second application, the one or more interactions being performed by a user, wherein the first application is concurrently displayed with the second application in a graphical user interface (GUI) on a client device;

recording, by the first application, context information related to the second application;

selecting a customer service application from a plurality of customer service applications, wherein the selecting is based on a preferred order from which to select the customer service application, the recorded one or more interactions, and the recorded context information, and wherein the preferred order is provided by an administrator of a website server that provides the plurality of customer service applications, wherein the administrator defines the preferred order by defining one or more rules that are independent of usage of the client device by the user, and wherein the defining of the preferred order by the administrator is performed via a user interface on a device separate from the client device, and wherein the website server is different than the client device, and wherein the administrator is different than the user;

generating, on the GUI and by the first application, a visual indicator for the selected customer service application;

causing display, on the GUI and by the first application, of the visual indicator for the selected customer service application on the second application;

identifying an interaction with the visual indicator on the GUI; and in response to identifying the interaction with the visual indicator, forming, by the first application, a customer service communication channel between the GUI and the website server remote from the GUI to provide assistance with operating the second application via the selected customer service applications corresponding to the visual indicator.

20. The at least one tangible computer-readable device of claim 19, wherein the plurality of customer service applications includes a video chat channel.

* * * * *